US008670350B2

(12) United States Patent
Page et al.

(10) Patent No.: US 8,670,350 B2
(45) Date of Patent: *Mar. 11, 2014

(54) APPARATUS FOR DISCOVERING DEVICES IN A WIRELESS NETWORK (75) Inventors: Kenin Page, Sandy, UT (US); Elwin Hunt, Sandy, UT (US)

(73) Assignee: PALM, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,334

(22) Filed: Sep. 23, 2011

(65) Prior Publication Data

US 2012/0045993 A1 Feb. 23, 2012

Related U.S. Application Data (60) Division of application No. 11/950,830, filed on Dec. 5, 2007, now Pat. No. 8,064,366, which is a continuation of application No. 10/206,488, filed on Jul. 25, 2002, now Pat. No. 7,324,462.

(51) Int. Cl.
H04L 12/28 (2006.01)

(52) U.S. Cl.
USPC .......................................... 370/255; 370/349

(58) Field of Classification Search
USPC ......... 370/255, 349, 230, 248, 252, 310, 328, 370/310.1, 329, 401, 402, 338, 341, 348
See application file for complete search history.

(56) References Cited

U.S. PATENT DOCUMENTS

| 7,020,456 B2 | 3/2006 | Smeets et al. | |
| 7,324,462 B1 * | 1/2008 | Page et al. | 370/255 |
| 8,064,366 B2 * | 11/2011 | Page et al. | 370/255 |
| 2002/0078149 A1 | 6/2002 | Chang et al. | |

* cited by examiner

Primary Examiner — Brenda H Pham (57) ABSTRACT

A Bluetooth-enabled computing device includes a user interface for displaying a prompt to specify a descriptive identifier for a network device prior to performance of a Bluetooth Device Discovery Routine, the descriptive identifier being different from Bluetooth Device Discovery Routine Identifiers. A system memory has entries including descriptive identifiers, each descriptive identifier corresponding to a network device pre-configured with a connection profile. A connection manager determines if a specified descriptive identifier is a match to any entry in the system memory and to implements a connection to a network device corresponding to a matching entry. Otherwise the connection manager performs a discovery routine to locate and establish a connection to at least one available network device corresponding to the specified descriptive identifier. A Bluetooth compatible wireless transceiver is operable to transmit and receive signals associated with the connection to the network device and the discovery routine.

11 Claims, 5 Drawing Sheets

APPARATUS FOR DISCOVERING DEVICES IN A WIRELESS NETWORK

RELATED APPLICATIONS

This application is a Divisional Application of commonly assigned and U.S. patent application Ser. No. 11/950,830, filed on Dec. 5, 2007, now U.S. Pat. No. 8,064,366 which claims priority from and is a continuation of U.S. patent application Ser. No. 10/206,488 titled "Methods for Discovering Devices within a Wireless Network," filed on Jul. 25, 2002, now U.S. Pat. No. 7,324,462 by Page, et al., the disclosures of which are incorporated by reference herein in their entireties.

THE FIELD OF THE INVENTION

This invention relates generally to the field of network communications. In particular, embodiments of the present invention relate to an apparatus for discovering devices connected within a wireless network.

BACKGROUND OF THE INVENTION

Short range wireless communication schemes are increasingly used as an alternative to wire-based networks to interconnect computers and computer devices. The use of wireless communications provides a number of advantages, including the elimination of complex, expensive, and inconvenient wire-based connection schemes. While a number of wireless communications standards have been developed for such applications, one popular example is known as "Bluetooth." The Bluetooth standard uses low power radio frequencies to allow communication between various devices such as mobile phones, laptop and desktop computers, printers, modems, PDAs, etc. This technology was originally envisioned for the purpose of replacing cabling and other hard-wired connection schemes 4 used to connect auxiliary devices to a desktop or laptop computer. However, Bluetooth has further evolved into a method of sending both data and voice signals between a wide range of devices. For example, a Bluetooth-enabled PDA can be configured to automatically connect to a Bluetooth-enabled communications line within a building, therefore gaining wireless access to computing resources, such as printers, an Internet portal, etc.

In an effort to ensure compatibility among Bluetooth implementations, a Bluetooth special interest group (SIG) was formed. One of the main objectives of the Bluetooth SIG is to formulate a standardized specification for every element of Bluetooth. The specification dictates numerous software and hardware characteristics so that devices made by different manufacturers will be compatible with one another. The specification dictates all aspects of Bluetooth technology from the software stack necessary to run Bluetooth devices to the actual hardware requirements.

As per this standard, Bluetooth compatible technology is composed of multiple components that together provide for wireless communication capabilities. For example, each Bluetooth-compatible device is configured with a radio that can transmit and receive wireless signals on a particular frequency band. In addition, there are certain structural elements required for connecting the radio to the specific host device. Further, each Bluetooth-compatible device is also configured with particular software to allow the device to properly process and route data or voice signals. This software is typically referred to as the "protocol stack" because it is composed of numerous components that are each configured to perform a particular function. Information is generally passed between the respective layers of the stack either from the bottom of the stack to the top or vice versa, depending on the direction of the communication involved. The protocol stack is further broken up into a "transport protocol group," a "middleware protocol group" and an "application protocol group.

In general, the transport protocol group includes functional components that are designed to allow Bluetooth devices to locate one another within a Bluetooth network, and to manage the links that allow higher layer protocols and applications to pass data through the transport protocols. The transport protocol group is comprised of a radio, a baseband controller, a link manager, a logical link control and adaptation protocol (L2CAP), and a host controller interface (HCI). The baseband controller defines how devices search for one another and how they connect to one another via a Bluetooth Device Discovery and Connection process. The baseband controller also defines the master and slave roles between devices. The link manager supervises the creation of pairing between devices and the encryption of data. The link manager also supervises power control among devices. For example, the link manager can initiate a low power adjustment between devices to conserve energy. The L2CAP supports the protocol multiplexing that allows multiple protocols to utilize the same air-interface. It also maintains the desired level of service among devices. The HCI allows higher layers of the stack to access the baseband controller and link manager. The HCI is not a required part of the Bluetooth specification and it can be located above or below the L2CAP depending on the configuration of the particular Bluetooth system. The radio, link manager and baseband controller are sometimes grouped together to form what is referred to as a Bluetooth module. The remaining components of the transport layer are typically located on the actual Bluetooth host device.

The middleware protocol group is directed to functionality that facilitates communication between host applications and the Bluetooth module. The protocols can include both third-party protocols and industry standard protocols specified by the Bluetooth SIG. The middleware protocol group specifically includes a RFCOMM, a service discovery protocol (SDP), a set of IrDa interoperability protocols, and a telephony control protocol (TCS). The RFCOMM protocol creates virtual serial ports to facilitate the replacement of cables with a wireless Bluetooth interface. The SDP protocol defines a standard method for Bluetooth devices to discover and learn about the services offered by other Bluetooth devices within the network. The set of IrDa interoperability protocols helps to define the syntax of the data to be exchanged between devices. The TCS protocol is designed to control the exchange of voice communications between devices.

The application protocol group consists of the various applications that utilize Bluetooth communications. The applications may be unaware that data is being transmitted over a Bluetooth air-interface rather than a standard cable, or the application may be specifically designed to interact with Bluetooth devices.

Bluetooth devices form what are known as "piconets" with one another. A piconet is comprised of one Bluetooth device acting as a master and numerous other devices acting as slaves. Both the master and the slave devices can transmit and receive data from one another. However, the master device defines the data hopping sequence and is usually the device that initiates the communication. Initiation of a communication depends, in part, on the configuration state of a device. For example, an "active state" is a system configuration in which the slave device is always listening for transmissions from the master. In a "parked state" the slave device is only periodically listening to the master. Thus, a parked slave must become active before it can communicate normally with the master. In addition, there is a sniff state and a hold state, both of which are considered active states. The sniff and hold states are used as alternatives to the full active state for the purpose of conserving power. A slave device in a sniff mode essentially communicates with the master at regular intervals rather than always listening. A slave device in a hold mode essentially stops listening to the master for a specified period of time.

There are several limitations present in the Bluetooth standard that can degrade the overall operating efficiency of a Bluetooth network. One limitation relates to a user's ability to locate and connect to other Bluetooth devices that may be available within a given location. For example, when the user of a Bluetooth-enabled host device (e.g., a PDA or other portable computing device) wishes to establish a connection with another Bluetooth device (e.g., a printer), and does not know the Bluetooth Device Address BD_ADDR of the remote device, a Bluetooth device discovery routine must be performed to first locate available devices before a connection can be established. The Service Discovery Protocol (SDP) in the Bluetooth protocol stack controls the operation of finding services provided by new wireless devices. The searching device acts as a master and attempts to transmit wireless signals in an effort to locate all devices within range. The location of devices involves transmitting a search signal and receiving an acceptance signal that contains information about the device. The located devices transmit back at least a unique identifier BD_ADDR that distinguishes the particular device from all other devices. These unique identifiers are then displayed for a user to select a device. Unfortunately, the unique identifier is generally a series of numbers and characters that do not provide the user with any useful information relating to what the device is, or what its functional capabilities are. Because of this, a user who is unsophisticated or unfamiliar with the particular device identifiers will have difficulty determining which devices to connect with. Each device does contain a friendly name that is meant to describe the wireless device but to obtain the friendly name of a particular device an additional query must be performed which is relatively time consuming.

Therefore, there is a need for an improved method of device discovery that is both user-friendly and efficient. In addition, the method should allow certain devices to be pre-configured as defaults so as to minimize connection steps required by a user. Such a method should increase both efficiency and versatility of a wireless network.

SUMMARY OF THE INVENTION

These and other problems in the prior art are addressed by embodiments of the present invention, which relate generally to an apparatus for locating a device within a wireless network.

A Bluetooth-enabled computing device according to the invention includes a user interface for displaying a prompt to specify a descriptive identifier for a network device prior to performance of a Bluetooth Device Discovery Routine, the descriptive identifier being different from Bluetooth Device Discovery Routine Identifiers. A system memory has entries including descriptive identifiers, each descriptive identifier corresponding to a network device pre-configured with a connection profile. A connection manager determines if a specified descriptive identifier is a match to any entry in the system memory and to implements a connection to a network device corresponding to a matching entry. Otherwise the connection manager performs a discovery routine to locate and establish a connection to at least one available network device corresponding to the specified descriptive identifier. A Bluetooth compatible wireless transceiver is operable to transmit and receive signals associated with the connection to the network device and the discovery routine.

More particularly, location of the network devices can be accomplished using a descriptive identifier, instead of the more complex, difficult to remember alphanumeric-type identifiers used in prior art solutions. In addition to providing a means by which a network device can be located easily, in preferred embodiments networked devices can be pre-configured in manner such that a connection can be automatically initiated without first having to perform a cumbersome and time-consuming device discovery operation. The invention thus increases the ease of use of a wireless network by providing a much more user-friendly process for locating and connecting to wireless devices within a network. Moreover, it increases the ease and efficiency by which a device is connected to another wireless device.

While not limited to any one particular wireless connection scheme, illustrative embodiments are described in the context of a Bluetooth-based wireless environment. Also, in the illustrated embodiments, the process steps for device discovery are implemented via computer executable instructions in the form of a software module, referred to herein as a "Bluetooth Connection Manager" or simply "Connection Manager." The software module is incorporated into and interfaced with functions of the Bluetooth protocol stack that resides in all Bluetooth wireless devices. More particularly, preferred embodiments utilize various protocols present within the Bluetooth protocol stack to perform various functions relating to device discovery and connection.

In one preferred embodiment, a user of a host device can specify a descriptive identifier for the remote wireless device that the user wishes to connect with. For example, a user with a Bluetooth-enabled PDA may travel to a building or office that is equipped with a Bluetooth-based network. The PDA user may require the services of a network-based device, such as a color printer. Utilizing the invention, the user would execute an executable software routine on the PDA (the Connection Manager), which first prompts the user for a descriptive identifier corresponding to the color printer (e.g., "HP xxxx color printer"). In a Bluetooth context, this descriptive identifier may correspond to what is commonly referred to as a "friendly name." The Connection Manager will then proceed with a standard Bluetooth Discovery process to locate all available devices. It then ascertains if the specified descriptive identifier corresponds with any of the located devices. If more than one device corresponds to this particular identifier, the user would then be prompted to select from the list of devices.

Once it is determined that a device corresponds to the specified descriptive identifier, the routine proceeds to automatically connect the user's device with the specified device. Note that in this implementation the user need only specify a device using a descriptive and intuitive identifier. The user does not need to have any knowledge of the underlying cryptic unique identifiers of network devices.

In certain embodiments, connections with wireless devices within a network are already pre-configured with connection profiles store in a connection profile database. In this scenario, if a user selects a device that is already pre-configured, there is no need to perform the time-consuming device discovery process. Instead, the specified device is automatically connected to the requesting device in accordance with the relevant connection parameters contained within the connection profile for that device. Only when the user specifies a device that is not pre-configured will the method perform a standard Bluetooth device discovery routine, in the manner described above. A connection with the specified device is then established, assuming it is available.

Consequently, the apparatus of the present invention provides a user with a connection scheme that is both user friendly, and much more efficient that traditional connection schemes. First, a user can specify a connection to a desired device by using a descriptive, easy-to-remember identifier and need not have any knowledge of the device's underlying unique—and difficult to remember—identifier. In addition, in the event that a connection to a particular device is pre-configured, a connection can be established without first having to complete a time consuming device discovery process. This greatly enhances the overall efficiency of the connection process.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and features of the invention are obtained, a more particular description of the invention briefly described above will be given by making reference to a specific embodiment that is illustrated in the appended drawings. These drawings depict only one embodiment of the invention and are not to be considered limiting of its scope.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to an improved method for locating devices within a network environment, such as a wireless network. More particularly, devices can be located by way of a simple and easy to remember descriptive identifier, as opposed to an arbitrary and difficult to remember identifier typically used in current solutions. In addition, methods of the present invention further allow for wireless devices to be pre-configured so that, once discovered, they can be automatically connected to a requesting device with little or no interaction from the user. This method of device discovery provides an environment that is easy to use from a user's perspective, both in terms of locating a suitable wireless device for a particular application, as well as in establishing a connection with the device.

For purposes of illustration, embodiments of the present invention are described in the context of a Bluetooth-based wireless computer network. However, it will be appreciated that the teachings of the present invention are applicable to other applications and network environments as well. For example, a similar method could be implemented in connection with other types of networks and wireless environments and standards.

Figure 1:
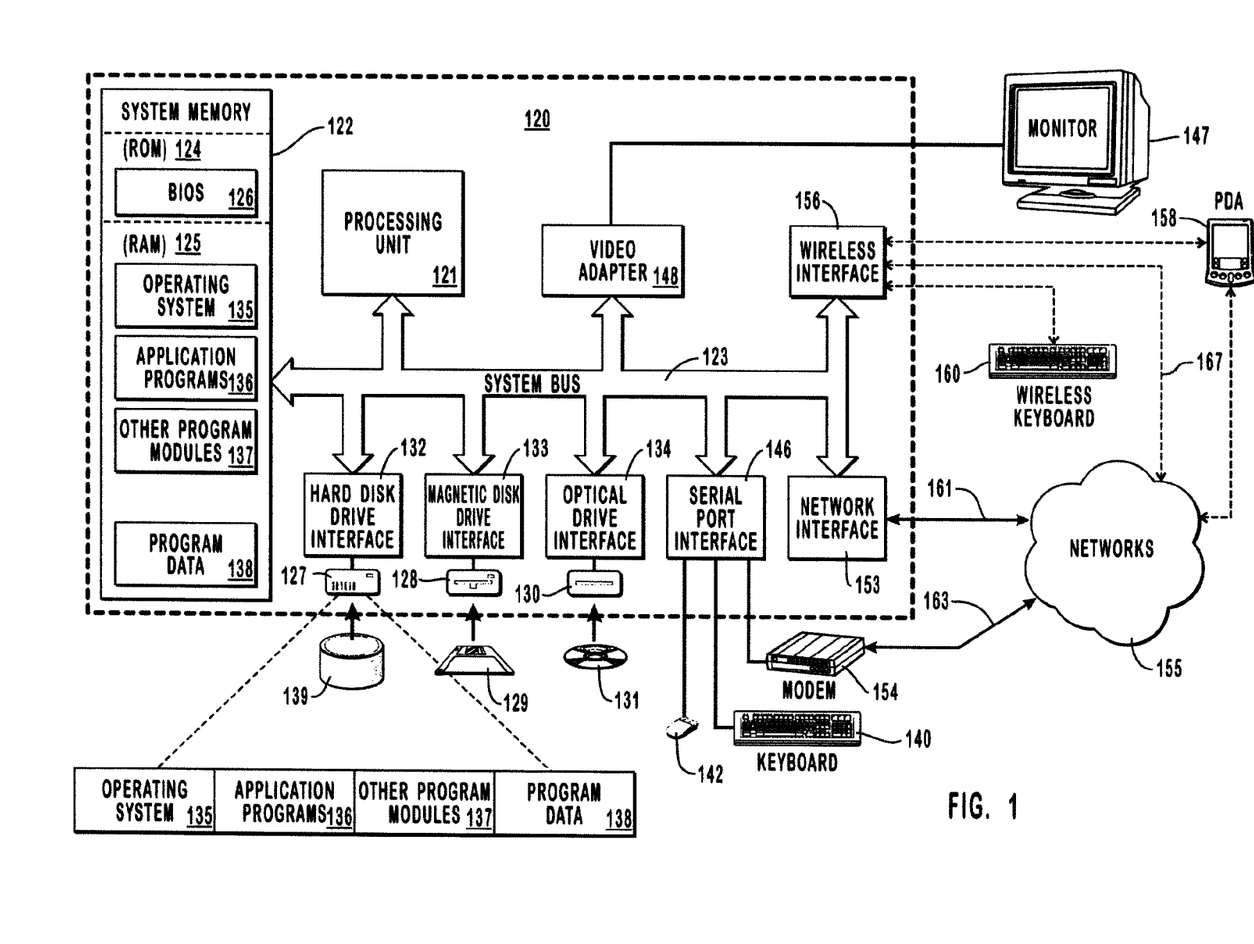
FIG. 1 illustrates a processing system that provides an example of one suitable operating environment for embodiments of the present invention.

FIG. 1 and the following discussion are intended to provide a brief, general description of an example of a suitable computing environment in which embodiments of the present invention may be implemented. Although not required, embodiments of the invention may be described in the general context of computer-executable instructions, such as program modules, being executed by computers operating within network environments. Generally, the term "program modules" is intended to include, without limitation, routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 1, an example system for implementing embodiments of the invention includes a general-purpose computing device, one example of which is shown in the form of a conventional computer 120. Computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and/or an optical disk drive 130 for reading from or writing to removable optical disk 131 such as a CD-ROM or other optical media. In this particular example, the magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Of course, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 and/or RAM 125. Examples include an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a wireless interface, a parallel port, a game port, a universal serial bus (USB) and the like. A monitor 147 or another display device is also connected to system bus 123 via an interface, such as video adapter 148. In addition to the monitor, some computers may include other peripheral output devices (not shown), such as speakers and printers.

The computer 120 may be operatively connected to a networked environment, an example of which is designated in FIG. 1 as network 155. As is well known, network 155 may be used to connect computer 120 to other remote computers, which may be personal computers, servers, routers, network PCs, peer devices or other common network nodes, and typically include many or all of the elements described above relative to the computer 120. Examples of various logical connections to network 155 are depicted in FIG. 1 include a wireless network 167, a wired local area network (LAN) 161, and a wide area network (WAN) 163. Each of the logical connections 167, 161, 163 represent a different way for the computer 120 to connect to the network 155. The wireless network 167 may utilize radio frequencies, microwaves, infrared light, etc. to transmit signals via the wireless interface 156 to the network 155. The wire-based LAN 161 utilizes, for example, an Ethernet, a USB network, or a token ring network to transmit signals from the network interface 153 to the network 155. The WAN 163 utilizes a modem 154 to decode the signals and a standard telephone line, wireless telephone line, coaxial cable, or fiber optic cable to transmit the signals from the serial port interface 146 to the networks 155. Such networking environments are commonplace in office-wide or enterprise-wide computer networks, intranets and the Internet.

By way of example, the wireless interface 156 could be implemented as a short range radio transceiver that preferably utilizes low power radio frequencies to transmit information over relatively short distances. For example, the wireless interface could be implemented as a Bluetooth or an 802.11 transceiver module, or any other equivalent type of wireless transceiver that is capable of wireless communication. In this way, the wireless interface 156 could be used to wirelessly connect the computer 120 to a wide range of external devices, computing devices, networks, etc. For example, a Bluetooth module may be connected to the computer 120 to allow for a wireless connection between the computer 120 and a PDA 158 similarly equipped with a Bluetooth module. In addition, the wireless interface 156 can connect to devices that typically use other interfaces when communicating with the computer 120. For example, keyboards are typically connected to the computer 120 via the serial port interface 146, but may also be connected with a Bluetooth module. To do so, the wireless interface 156 typically includes a protocol that is capable of emulating a standard interface communication sequence, such as a serial port. For example, in a Bluetooth system, the RFCOMM protocol can be used to create virtual serial ports so that serial devices can be wirelessly connected to the computer 120 via the wireless interface 156 without extensive manipulation of existing software drivers, application software, etc.

For purposes of illustration, wireless transceiver module 156 in FIG. 1 is implemented as a Bluetooth compatible wireless transceiver or radio. As previously discussed, a Bluetooth transceiver device 156 is configured with a radio that can transmit and receive signals on a particular frequency band. In addition, the device is typically programmable, and is configured with software to process and route wireless signals. This software is implemented as a protocol stack, which is comprised of functional components that are organized within adjacent layers to form a logical stack. Also, depending on the implementation scheme, certain of the components of the stack reside within the host device (such as computer 120) memory and are executed by the host processor (121 in FIG. 1), and other components of the stack are stored and executed at the Bluetooth module itself (e.g., 156 in FIG. 1).

Figure 2:
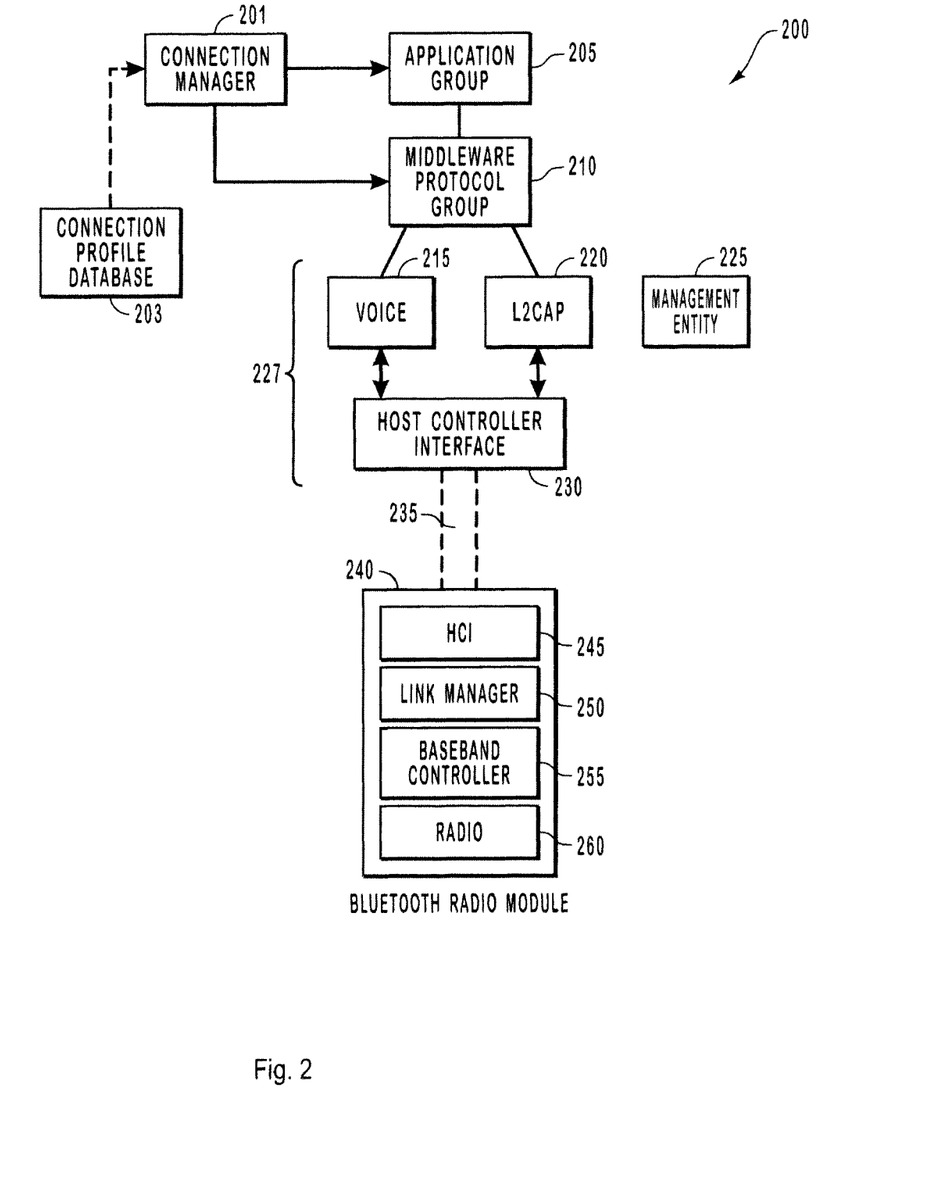
FIG. 2 illustrates a functional block diagram of an example of a Bluetooth protocol stack implemented in accordance with the teachings of the present invention.

Reference is next made to FIG. 2, which is a functional block diagram illustrating a presently preferred embodiment of a host-based Bluetooth protocol stack, designated generally at 200, that is implemented in accordance with the teachings of the present invention. In the illustrated example, the protocol stack 200 is comprised of multiple sub-elements that are arranged in logical layers to indicate a sequence of communication. Typically, information is passed either from the bottom to the top or vice versa. The uppermost element of the protocol stack 200 is the Application Group 210. The Application Group 210 represents higher level applications—such as word processors, spreadsheets, communications programs and the like—that directly interact with the user. The application often sends commands to devices that may be connected via a Bluetooth radio such as a printer, a modem, a fax, etc.

The next functional layer in the protocol stack 200 is referred to as the Middleware Protocol Group, designated at 215. The Middleware Protocol Group 215 represents the various protocols that are used as a communication interface, or channel, between the applications residing in the Application Group 210 and the lower levels of the protocol stack, designated at 227. Exemplary protocols include TCP, TCS-BIN, PPP, and the like. The applications in the Application Group 210 may use one or more of these or other protocols to communicate with the lower levels 227 of the protocol stack 200.

In the illustrated embodiment, a Bluetooth Connection Manager, or simply "Connection Manager" designated at 201, is functionally interfaced with the protocol stack 200. This Connection Manager 201 is a software module executing on the host device that provides the user with an application for initiating a connection with another Bluetooth device that may be available within the Bluetooth transmission area, or network. As will be described in further detail below in connection with FIGS. 3-5, the Connection Manager operably interfaces with certain functional components of the protocol stack so as to simplify the process that must be followed when connecting to another Bluetooth device. In general, it allows a user to specify a device via a descriptive identifier and eliminates the need to have any knowledge of a device's unique identifier. Moreover, in certain embodiments, it automatically connects to devices that have pre-configured connection profiles, thereby avoiding the need to perform additional time-consuming device discovery routines. Under this scenario, the Connection manager will retrieve the connection profile of a pre-configured device from a connection profile database, as is indicated at functional box 203.

As is further shown in FIG. 2, A Host Controller Interface (HCI) is located both within the lower level 227 (HCI designated at 230) of the protocol stack 200 and within the actual Bluetooth module 240 (HCI designated at 245). Each of the HCIs 230, 245 provide a predefined and standardized interface between the lower level 227 of the protocol stack 200 and the Bluetooth module 240. The standard interface is designed to allow for compatibility among Bluetooth module manufacturers.

In FIG. 2, a physical connection scheme, such as connector 235, is used to physically connect the Bluetooth radio module 240 to the host device and therefore provide for a logical connection to the lower level 227 of the protocol stack 200 (which typically executes at the host device). The connector 235 can be implemented as any appropriate connection scheme, such as a standard connector, including a USB, serial, parallel, PC board, PCI and the like. As previously noted, the Bluetooth radio module 240 includes a HCI 245. In addition, the module 240 typically includes a Link Manager function, represented at 250; a Baseband Controller function, designated at 255; and a Radio transceiver device, which is represented at functional block 260. By way of summary, the Link Manager 250 manages the properties of the air interface between the module 240 and other remotely positioned Bluetooth devices. In addition, the Baseband controller 255 manages how the Bluetooth module 240 communicates with other Bluetooth devices. Finally, the radio 260 transmits and receives the low power radio signals across the air interface between the module 240 and other remotely positioned Bluetooth devices.

Figure 3:
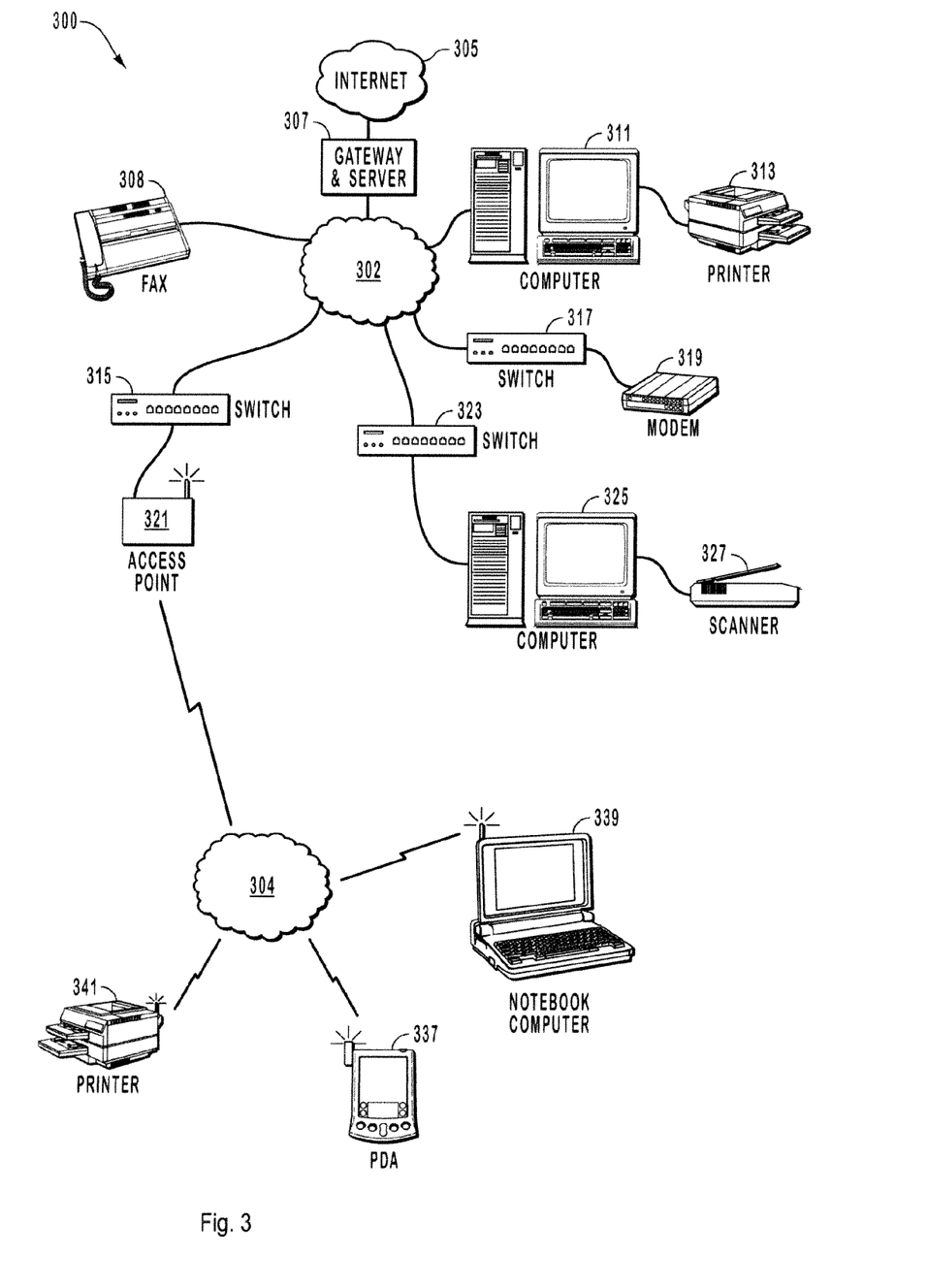
FIG. 3 is a schematic diagram of an example of a network environment in which one embodiment of the present invention could be implemented and utilized.

Reference is next made to FIG. 3, which illustrates one example of a network environment, designated generally at 300, in which an embodiment of the invention could be implemented and used to locate, and then connect to, a Bluetooth-enabled wireless device. In this particular example, the network environment is composed of a wire-based network, designated at 302, and a wireless-based network designated at 304. The wire-based portion of the network 302 includes a gateway and server 307, which provides a connection to the Internet 305. Access to the wire-based network is provided to wireless devices via a wireless access point, which is designated at 321.

As is shown in the illustrated example, in network 302, network devices can be connected to the network via the servers, via other computing devices (such as switches 315, 323), via the wireless access point 321, or they can be connected directly to the network via an appropriate network interface. For example, Fax machine 308 is directly connected to the network 302. As is well known, a direct connection to the network medium (whether it be wire-based or wireless) requires the device to have some form of network interface, such as a network interface card (NIC) 153 (FIG. 1). Alternatively, devices can be connected to a switch or a computer that possesses the necessary network interface device for connecting to the network. For example, printer 313 is connected to computer 311 which is in turn connected to network 302.

Certain wireless standards such as Bluetooth allow for "ad hoc" networking wherein a device merely enters a particular area and can be automatically connected to a network. This would allow the user of a wireless computer device, such as the PDA 337 or the notebook computer 339 in the illustrated example, to travel to the vicinity of wireless network 304 and instantly be able to utilize any of the devices within the network. Thus, a Bluetooth-enabled device, such as PDA 337, can communicate directly with another Bluetooth-enabled device, such as printer 341. Alternatively, the Bluetooth-enabled device can access resources on the wire-based network 302 via a wireless access point, such as that designated at 321.

As is further shown in FIG. 3, the method of device discovery of the present invention could be implemented in the illustrated network environment to allow a newly connected wireless device to efficiently locate other available wireless devices. For example, a user of the wireless-enabled notebook computer 339 or the PDA 337 may join the wireless network 304 and then wish to locate, connect to, and then utilize resources on that network (or network 302), such as the printer 341.

In a preferred embodiment, the host wireless device (e.g., computer 339 or PDA 337) would carry out a series of program steps via a program module executing on the device (e.g., a Connection Manager), which would automatically connect the host device to a desired network resource via the wireless channel. For example, in the preferred embodiment, the program module would prompt the user for a descriptive identifier pertaining to the network device the user wishes to wirelessly connect to. Moreover, if the device sought is appropriately configured, the method would then automatically establish a wireless connection between the user's host device, such as PDA 337, and the located device, such as printer 341. If the printer 341 is not a pre-configured device, a standard Bluetooth service discovery process is implemented using the SDP protocol within the Bluetooth stack. The process will then automatically determine if any of the discovered devices correspond to the device specified by the user. If the specified printer 341 is available, then the method proceeds to automatically establish a wireless connection between the PDA 337 and the printer 341. Note that the same type of process would be followed in the event that the wireless host (such as PDA 337) seeks to locate and connect to network resources on the wired network 302 via wireless access point 321.

Figure 4:
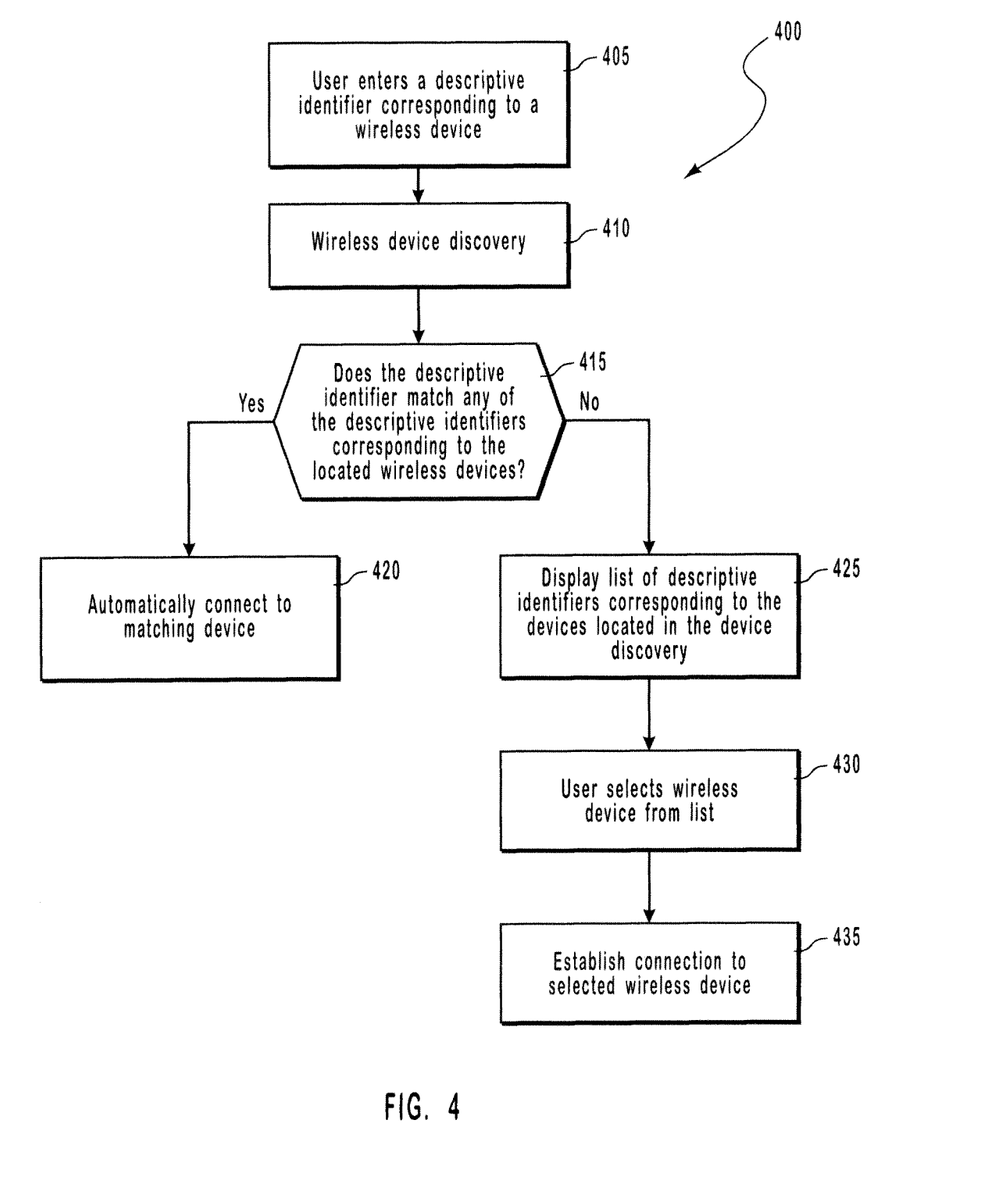
FIG. 4 is a flow chart illustrating of one presently preferred embodiment of the process steps that can be used to implement one aspect of the present invention.

Reference is next made to FIG. 4, which illustrates a flow chart, designated generally at 400, showing in further detail the process steps used to implement one presently preferred embodiment of the present invention. Again, the process steps are preferably implemented as computer executable instructions in the form of a software routine as a Connection Manager, that is capable of being executed on a suitable computing device, such as is illustrated in FIG. 1. Moreover, in the exemplary environment, the software routine is implemented in the context of a Bluetooth environment, and in the context of a Bluetooth wireless communication stack of the sort described and illustrated in FIG. 2. Moreover, in a preferred embodiment the Connection Manager (201 in FIG. 2) is implemented in a manner so that interaction with the user is provided via a graphical user interface (GUI) so as to provide an easy to use environment. For example, a GUI implemented in accordance with the look and feel of a standard Microsoft® Windows operating environment is contemplated.

Beginning at program step 405, the process begins by prompting the user to provide an appropriate descriptive identifier for a wireless device that the user would like to access. Preferably, the descriptive identifier is a functional and/or descriptive name of the device, such as "Cannon Color Printer NW corner," such as what corresponds to the Bluetooth "friendly name." Optionally, the descriptive identifier could also be a Bluetooth "friendly name" of a device. Generally, the descriptive identifier used will be intuitive and easy to remember and unlike the unique identifiers commonly assigned to a Bluetooth wireless device, which is typically comprised of a 6-byte number. Obviously, this type of information is not easy to remember for a typical user. Note that this descriptive identifier could be entered directly by the user, or could be selected from a displayed list of options. The list of options could be from a pre-configured data base, for example that is set up by a network administrator to include all wireless devices available within a network. Optionally, particular devices requested by a user may have an associated password or PIN for security reasons. Access to the device would then require entry of this predefined password.

Once the user has specified a device via its descriptive identifier, the process then continues at program step 410, where a wireless service discovery routine is performed. In a preferred embodiment, this step utilizes the utility services already available within the Bluetooth stack to locate and identify any Bluetooth-enabled devices that are within communication range, sometimes referred to as Bluetooth Device Discovery. In so doing, the initiating host device acts as a Bluetooth master and transmits a "request signal" to the other devices within transmission range. All devices within range will respond to this signal by providing information, including the unique identifier that has been assigned to the device. An additional query to each device can retrieve the descriptive identifier ("friendly name") for that device. Thus, at this stage of the process there is available a database or list of all wireless devices within range of the requesting device.

Once all available devices have been discovered, processing continues at program step 415. Here it is determined whether the user-specified descriptive identifier (or friendly name) matches that of any of the available wireless devices discovered at process step 410. In the event that the device discovery process only results in the compilation of unique identifiers (i.e., and not a descriptive identifier/friendly name), a data map or similar type of conversion table may be used to automatically convert the unique identifier into a descriptive identifier/friendly name that can then be compared to the identified descriptive identifier. The method of comparison may use a straight character to character comparison routine or it may look for textual similarities. A straight character to character comparison would only find a match if the identified descriptive identifier exactly matches one of the descriptive identifiers of the available devices. Alternatively, a textual similarity comparison would find a match if there are similar words or descriptions. If a similarity comparison method is used, the method may additionally prompt the user to confirm that the matching device is the device that he or she wishes to connect with. Alternatively, the similarity comparison routine could be used to display a list of relevant available devices based on the user entered description rather than displaying a list of all of the available devices. For example, if the user enters "HP," then the list of available devices could be "HP InkJet 995 Printer, HP Laserjet 5MP Printer." The similarity comparison and display routine could be analogous to the methods used by Internet search engines to locate relevant web pages.

If at step 415 a match between the user-specified descriptive identifier and one of the available devices is made, the method will automatically establish a wireless connection between the user's device and the matching available device, as is indicated at program step 420. Again, this connection procedure is accomplished via routines provided by the Bluetooth stack.

As is further shown in FIG. 4, if the user-specified descriptive identifier fails to match any of the descriptive identifiers of the available devices at program step 415, processing proceeds at program step 425. Here, the program causes a list of all of the descriptive identifiers pertaining to the available devices to be displayed. The user can then select the device to connect to, as is indicated at program step 430. This step is useful, for example, when the originally identified device is not in operation, is not available, or was not properly identified. Alternatively, a functional limitation could be added to limit the number of devices displayed to the user. For example, if the originally identified device was a specific printer for which there was no comparison in step 415, the method at step 425 could be configured to display only the descriptive identifiers of all available printers. The user will then identify or select one of the displayed descriptive identifiers pertaining to the available printers.

Once an appropriate device is selected by the user, the program method will proceed to program step 435. Here, a wireless connection is established between the user's host device and the selected wireless device. At this point, the host device and its applications can proceed to utilize the services of the selected wireless device as if it were connected directly to the host device.

Figure 5:
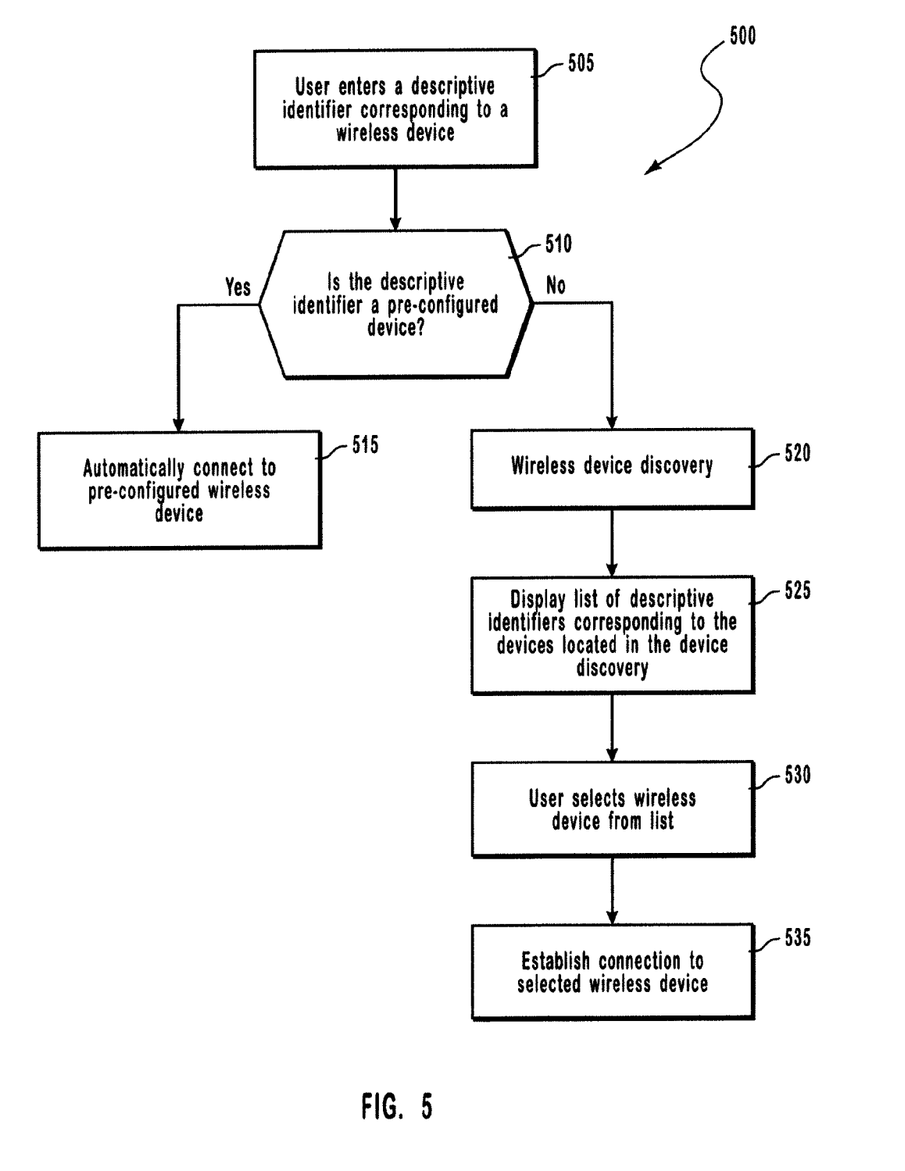
FIG. 5 is a flow chart illustrating yet another embodiment of the process steps that can be used to implement an aspect of the present invention.

Reference is next made to FIG. 5, which illustrates a flow chart, designated generally at 500, showing yet another embodiment of the process steps that can be used to implement the method for device discovery in the form of a Connection Manager. The embodiment illustrated in FIG. 5 can be utilized, for example, in situations where wireless devices are "pre-configured" with a connection protocol, which can be saved within a database location, such as connection profile database designated at 203 in FIG. 2. Preferably, this pre-configuration will be in the form of a profile that contains connection parameters for the particular device involved. Profiles can be set up for multiple device types and distributed with the Connection Manager software. For example, connection profiles for all of the wireless devices (e.g., printers, facsimile machines, etc.) within a particular location (such as an office or building) can be compiled and stored for later access by the Connection Manager. As such, if a user specifies a device that is pre-configured within this database, the connection process can be accomplished without having to first perform the time-consuming Bluetooth Device Discovery process. This results in a much faster and more efficient connection.

Thus, beginning at program step 505, the software first prompts the user to specify a device by entering (or selecting from a list) a descriptive identifier (or friendly name) pertaining to the wireless device that the user wishes to access. Processing then continues at program step 510, where it is determined if the specified descriptive identifier corresponds to a "pre-configured" wireless device, i.e., one that has a profile contained within a database. If the specified descriptive identifier is one that corresponds to such a pre-configured wireless device, then processing will proceed directly to program step 515, where the user's host device is automatically connected to the specified device. Note that under this scenario, the Bluetooth device discovery process is avoided, resulted in a much more efficient and timely connection process.

If however it is determined at step 510 that the specified device does not match a pre-configured device, then the method will proceed with the execution of a standard device discovery routine, as is indicated at step 520. Processing here will proceed with steps 525 and 530 in much the same fashion as was described in connection with the embodiment of FIG. 4. This ultimately results with connection to the specified device.

To summarize, methods of the present invention can be provided in the form of a Bluetooth Connection Manager software routine that provides a user of a Bluetooth enabled device with a simple and efficient means for connecting to other devices within a Bluetooth network. In particular, the methodology provides the user with the ability to specify a device by using an easy-to-remember descriptive device name. This negates the need for a user to utilize difficult to remember and non-intuitive device addresses. Moreover, embodiments of the invention permit the pre-configuration of network devices within a database using the descriptive identifiers so that a user can specify and connect to a pre-configured device without having to perform a time consuming and cumbersome device discovery process. Again, not only is this accomplished with easy-to-remember device names, but it is avoids unnecessary processing and thus results in a much quicker connection process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of wirelessly connecting a computer device to a peripheral device comprising the following steps:
   prompting a user, through said computer device, to identify a descriptive identifier for a peripheral device;
   performing a wireless discovery routine to locate available peripheral devices, wherein performing the wireless discovery routine is performed after prompting the user to identify the descriptive identifier;
   determining if the identified descriptive identifier corresponds to identifiers of any of the available peripheral devices; and
   if the identified descriptive identifier corresponds to an identifier of an available peripheral device, establishing a wireless connection between the computer device and the peripheral device.

2. The method according to claim 1, wherein the determining step includes the step of comparing the descriptive identifier to identifiers of the available peripheral devices.

3. The method according to claim 1, wherein the wireless connection is implemented in accordance with any Bluetooth wireless communications standard.

4. The method according to claim 1, wherein the wireless discovery routine is performed in accordance with a predefined discovery process implemented on the computer device.

5. The method according to claim 1, wherein the wireless discovery routine is a Bluetooth Device Discovery Routine.

6. The method according to claim 1, wherein the descriptive identifier is different from Bluetooth Device Discovery Routine identifiers.

7. A device comprising:
   a user interface for displaying a prompt to identify a descriptive identifier for a peripheral device prior to performance of a wireless discovery routine to locate available peripheral devices;
   a system memory having entries including descriptive identifiers, each descriptive identifier corresponding to available peripheral devices;
   a connection manager to determine if an identified descriptive identifier is a match to any of the available peripheral devices and to establish a wireless connection between the computer device and the peripheral device if the identified descriptive identifier is a match to any of the available peripheral devices.

8. The device according to claim 7, wherein the connection manager is to compare the identified descriptive identifier to identifiers of the available peripheral devices.

9. The device according to claim 7, wherein the wireless connection is implemented in accordance with a predefined discovery process implemented on the computer device.

10. The device according to claim 9, wherein the predefined discovery process is a Bluetooth Device Discovery Routine.

11. The device according to claim 7, wherein the descriptive identifier is different from Bluetooth Device Discovery Routine identifiers.

* * * * *